(12) United States Patent
Guilbert et al.

(10) Patent No.: US 6,933,332 B2
(45) Date of Patent: Aug. 23, 2005

(54) POWDERED EPOXY COMPOSITION

(75) Inventors: Curtis R. Guilbert, Austin, TX (US); Steven H. Huang, Austin, TX (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/392,552

(22) Filed: Mar. 20, 2003

(65) Prior Publication Data

US 2003/0191218 A1 Oct. 9, 2003

Related U.S. Application Data

(63) Continuation-in-part of application No. 10/034,534, filed on Dec. 12, 2001.

(51) Int. Cl.⁷ .......................... C08G 59/62; C08L 63/02
(52) U.S. Cl. ...................... 523/462; 523/451; 523/466; 525/523; 528/87
(58) Field of Search ............................... 523/451, 462, 523/466; 525/523; 528/87

(56) References Cited

U.S. PATENT DOCUMENTS

| | | | |
|---|---|---|---|
| 5,418,265 A | * | 5/1995 | Matsuzaki et al. .......... 523/440 |
| 5,708,039 A | | 1/1998 | Daly et al. |
| 5,747,565 A | | 5/1998 | Ono et al. |
| 6,344,155 B1 | | 2/2002 | Kitahara et al. |

FOREIGN PATENT DOCUMENTS

| | | | |
|---|---|---|---|
| JP | 6256475 | * | 9/1994 |
| JP | 07-258384 | | 10/1995 |
| JP | 11-172075 | | 6/1999 |

OTHER PUBLICATIONS

Abstract of Japanese Pat. 6256475, 1995, Chemical Abstracts.*

* cited by examiner

Primary Examiner—Jeffrey B. Robertson
(74) Attorney, Agent, or Firm—Gregg H. Rosenblatt; Yen Tong Florczak

(57) ABSTRACT

A cured epoxy coating comprising from about 30% to about 40% of at least one epoxy resin selected from the group consisting of diglycidyl ethers of bisphenol A, from about 55% to about 60% of a particulate flame retardant, from about 1% to about 4% of at least one multifunctional hindered phenol; and no more than about 5% of at least one adhesion promoter. The cured coating provides insulation for electrical current carriers and has an average surface roughness from about 10 μm to about 13 μm as measured using a Pethometer M4P 150 surface profile measuring instrument.

11 Claims, No Drawings

POWDERED EPOXY COMPOSITION

This is a continuation-in-part application of U.S. patent application Ser. No. 10/034,534 filed Dec. 12, 2001, now allowed.

TECHNICAL FIELD

The present invention relates to a fusion bonded, powdered epoxy composition exhibiting low melt viscosity during application to a substrate for uniform coating and good penetration into small gaps and crevices in the substrate. In particular, the invention relates to powdered epoxy compositions using melt viscosity modifiers for low melt viscosity and improved flow during application to substrates including metal bars, rods and coils and the like.

BACKGROUND

Powdered epoxy coating compositions have many applications. One useful application is in the field of motors. A typical motor can contain many components, e.g., a rotor (or armature) and a stator. It is very common for the rotor and the stator to contain wires, typically copper wires, wound about a part. The wound wires are commonly referred to as a "winding". Motor or coil windings require an insulating coating, over the metal windings, to protect the windings from dust, moisture, and chemicals. In some cases the insulating materials tend to be porous and moisture absorbent. Motors having windings with inadequate protection, due to an inferior or damaged coating, could cause equipment failure when exposed to adverse conditions such as high humidity environments. Materials drawn into motor windings during normal use may produce a moisture absorbing buildup that impairs motor ventilation. Moisture drawn into motor windings in this manner creates paths of current flow to ground. Once this path is developed the carbon trail left behind will continue to conduct until failure occurs.

Epoxy coatings have been shown to protect metal windings. For example, U.S. Pat. No. 5,747,565 (Ono et al.) discloses an epoxy powder coating composition suitable for use in insulating electric and electronic parts. The patent discloses a composition comprising (A) 100 parts by weight of a mixed epoxy resin having an epoxy equivalent of 800–2000 and including (i) a diglycidyl ether of bisphenol A having an epoxy equivalent of 180–2500 and (ii) a rubber modified epoxy resin having an epoxy equivalent of 180–2500 and obtained by reaction of a diglycidyl ether of bisphenol A with a carboxyl terminated acrylonitrile butadiene copolymer; (B) a mixed curing agent consisting of (i) 0.05 parts by weight of an imidazole compound, (ii) 0.5–10 parts by weight of dicyanodiamide and (iii) 1–10 parts by weight of a dihydrazide of a dibasic carboxylic acid and (C) 50–100 parts by weight of silica.

Japan Kokai 11-172075 discloses an epoxy resin composition comprising (A) at least 60 wt % of a cystalline epoxy resin, (B) a phenolic resin curing agent which can be a Bisphenol A type epoxy, (C) a fused silica powder and (D) at least one type of hardener accelerator such as an imidazole.

Japan Kokai 07-258384 discloses an epoxy resin composition comprising (A) crystalline epoxy resin, (B) a phenolic resin curing agent of a bisphenol A epoxy resin type, (C) a novolak phenolic resin, (D) Bisphenol A, and (E) an imidazole accelerator.

It is known in the art to also use a liquid varnish to coat the windings. A typical process involves trickling the varnish on the winding to coat the metal wires. Such a process tends to be time consuming. Also, varnishes typically contain volatile organic components making them environmentally unfriendly.

While the foregoing technologies may be useful, what is needed in the art is different powdered epoxy compositions that exhibit good adhesion and yet provide good flow characteristics when the composition is applied to a variety of substrates, particularly metal substrates.

SUMMARY

It is believed that this is the first time a multifunctional phenol group, used in the high amount disclosed herein, is used as a viscosity modifier in a powder coating composition.

In brief summary, in one aspect, the present invention pertains to a powdered epoxy composition comprising: (a) from about 30 to 40 wt % of at least one crystalline epoxy resin, (b) from about 10 to 40 wt % of at least one phenolic resole resin; (c) from about 10 to 40 wt % of at least one multifunctional branched hindered phenol. All percentages are based on the total composition weight. Optionally, the composition further includes less than about 1 wt % benzoin, up to about 50 wt % bisphenol A terminated epoxy, and less than about 1 wt % methylimidazole.

The inventive powdered epoxy can be used as a protective coating on any surface. In one application, the powder is applied to a heated substrate. Upon contact with the heated substrate, the powder melts, reacts, and forms a coating. In another application, the powder is first melted and then applied to a substrate. The powder can also be electrostatically charged and the charged powder particles are then attracted to a substrate, which can be subsequently heated. The powdered epoxy is particularly suitable for coating electrical windings in motor coils. In particular, the powdered epoxy can be used to package and encapsulate electric rotors and stators, to consolidate coil windings, and to bond the coils to rotor cores. The powdered epoxy can also be used in bobbin wound wires for transformers. Because of its low melt viscosity, the inventive powdered epoxy can be used as a binder for fibrous substrates. For example, personal computer boards typically start out as a substrate containing intertwined fibers, which can be secured to one another after they are impregnated with the inventive powdered epoxy.

Powdered epoxy compositions according to the present invention include fusion bonded powder epoxy coatings used to insulate electrical current carriers, such as buss bars, that provide energy to a variety of electrical distribution systems and devices. During operation, buss bars become heated to temperatures that could damage surface insulation, possibly causing charring and, in extreme cases, ignition of the insulating epoxy material. Flame retardants may be used to overcome the destructive effect of elevated temperature on insulating coatings.

Commonly used flame retardants include those containing halogen substituents and particulate flame retardant materials or mixtures thereof. Particulate flame retardant materials provide an attractive alternative to halogen containing flame retardants that potentially contribute to environmental pollution. However, the amount of particulate fire retardant needed for effective flame retardancy may adversely impact coating formulation properties, for example flow characteristics and smoothness. Powdered epoxy coating compositions according to the present invention provide coating formulations having, in their heated, molten state, improved flow during application and improved appearance upon cooling.

While not wishing to be bound by theory, it appears that a relationship exists between elevated temperature flow, room temperature appearance and the amount of a selected multifunctional phenol component used for modifying the melt viscosity of coating compositions according to the present invention. Such coating compositions contain a powdered epoxy composition comprising from about 30% to about 40% of at least one epoxy resin selected from the group consisting of diglycidyl ethers of bisphenol A. The composition also includes from about 55% to about 60% of a particulate flame retardant, from about 1% to about 4% of at least one multifunctional hindered phenol, and no more than about 5% of at least one adhesion promoter.

Upon heating at an elevated temperature of about a powdered epoxy composition according to the present invention becomes a cured epoxy coating comprising from about 30% to about 40% of at least one epoxy resin selected from the group consisting of diglycidyl ethers of bisphenol A, from about 55% to about 60% of a particulate flame retardant, from about 1% to about 4% of at least one multifunctional hindered phenol; and no more than about 5% of at least one adhesion promoter. The cured coating has an average surface roughness from about 10 μm to about 13 μm as measured using a Pethometer M4P 150 surface profile measuring instrument.

The invention provides for an epoxy coating that has excellent overlap shear, as defined below. Such a property is particularly desirable in motor coils to keep the individual wires in the winding insulated from one another and to minimize the possibility that the wires would detach from the winding itself during use.

Advantageously, the multifunctional branched hindered phenol functions to reduce the powder coating viscosity when it is applied to a heated substrate thereby allowing for better penetration of the coating into small crevices on the substrate. It is also believed that the use of the hindered phenol increases the coating's overlap shear.

When compared to the prior art, the present invention uses considerably less crystalline epoxy resin, which is usually one of the more expensive components in the composition. The economic advantage, when coupled with a short processing time required to apply the powdered epoxy to substrates including metal buss bars and motor coils, makes the inventive powdered epoxy composition especially useful in industry.

DETAILED DESCRIPTION

Each component of the inventive composition and the method of making the composition are described in detail below.

In general, the crystalline epoxy resin used herein is a traditional crystalline solid at room temperature (22° to 25° C.). The crystalline epoxy resin is present from about 25 to 45 wt %, preferably from about 30 to 40 wt %, based on the total weight of the composition. Useful crystalline epoxy resin has an equivalent weight of less than about 130, preferably from about 115 to 125 or a melt viscosity of less than about 5 centipoise, preferably about 2 to 3 centipoise at 150° C. More preferably, the crystalline epoxy resin has an equivalent weight from about 115 to 125 and a melt viscosity of about 2 to 3 centipoise at 150° C. Preferably, the crystalline epoxy resin contains little to no oligomers.

One illustrative and useful crystalline epoxy resin is the hydroquinone type shown in the formula below. Such an epoxy resin has an equivalent weight of about 120 and a melt viscosity of about 3 centipoise at 150° C.

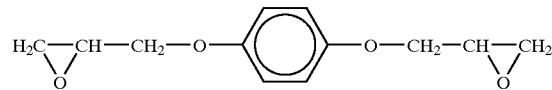

The phenolic resole resin and the multifunctional branched hindered phenol act as curing resins. As used herein, the term "resole" means a condensation product produced by the reaction of phenol and formaldehyde under alkaline conditions. Illustrative suitable phenolic resole resin useful for the practice of the present invention is commercially available from Schenectady International, Schenectady, N.Y. as product number HRJ-1367. This resin is present from about 10 to 40 wt %, preferably from about 15 to 35 wt % based on the total weight of the composition.

As used herein, the term "multifunctional branched hindered phenol" means a phenol selected from the group consisting of trifunctional phenol, tetrafunctional phenol, and combinations thereof. In addition to its function as a curing agent, the multifunctional branched hindered phenol is also a viscosity modifier. Illustrative suitable multifunctional branched hindered phenols include commercially available IRGANOX 1010 (tetrafunctional) from Ciba Speciality Chemicals, Tarrytown, N.Y. and commercially available LOWINOX 1790 (trifunctional) from Great Lakes Chemical Co., Indianapolis, Ind. Such hindered phenols are present from about 5 to 40 wt %, preferably from about 10 to 40 wt %, based on the total composition weight. Thus, it has been discovered that IRGANOX 1010, commonly used as a heat stabilizer at 1% or less, can be used at up to 40 wt % in the inventive composition to reduce melt viscosity. Because IRGANOX 1010 is a tetrafunctional branched hindered phenol, it is believed that it can cure into the inventive composition while not reducing the overlap shear. An added benefit is that IRGANOX 1010 has a very low environmental toxicity and is rated a food-grade material.

The following optional components can be used in the inventive composition. A flow agent, such as benzoin, was added to aid the release of volatile gases when the powdered epoxy is applied to a heated substrate to form a coating. The flow agent also helps to produce coatings with minimal number of voids. The agent additionally aids in the water release of the condensation reaction that occurs with the homopolymerization of the phenolic resole resin. When used, the benzoin is present at 1 wt % or less of the total composition weight.

Bisphenol A terminated epoxy, a polymeric epoxy, is another optional component. If used, it is present up to about 50 wt %, preferably from about 35 to 45 wt % of the total composition.

The epoxy curing resin is also capable of self-curing, i.e., it reacts via homopolymerization during curing of the powder coating. Preferably, a catalyst is used to cause the reaction to progress at a commercially acceptable rate. A preferred catalyst for this invention is 2-methylimidazole, though other members of the imidazole family can be, e.g. 2-ethyl-, propl-, butyl, and the like.

Method of Making

Powdered resins can be made by a high temperature (e.g. >200° F.) extrusion of a mixture of resins and curing agents to obtain a homogeneous mixture. The mixture can then be ground to yield the comminuted product, which can be screened to obtain the desired particle size distribution.

A preferred method of making the inventive composition is to charge the components in a high shear blender equipped with cooling. An illustrative suitable blender is commercially available from Micro-Mill Bel-Art Products, Pequannock, N.J. Preferably, the blender contains a jacket where compressed air (at temperature between 40 to 60°) is used as a coolant. Blending time depends on the final desired particle size and one skilled in the art should take care to choose the appropriate blending time.

The powdered epoxy composition can then be dropped, i.e., using gravity to apply the powder, on a heated substrate. Alternatively, the powdered epoxy can be electrostatically sprayed onto a substrate. One skilled in the art will appreciate that other methods exist for applying the powdered epoxy composition to a substrate.

EXAMPLES

The following examples are provided to illustrate different embodiments and details of the invention. Although the examples serve this purpose, the particular ingredients and amounts used as well as other conditions and details are not to be construed in a manner that would unduly limit the scope of this invention. Unless otherwise specified, all percentages are in weight percent.

TABLE 1

Abbreviations

| | Description | Source |
|---|---|---|
| RSS | crystalline epoxy: RSS 1407 2,2'-{(3,3',5,5'-tetramethyl{1,1'-biphenyl}-4,4'-diyl)bis (oxymethylene)}bis- | Shell Oil Co., Houston, TX |
| RD | crystalline epoxy: resorcinol diepoxy | Dow Chemical Co., Midland, MI |
| D 85 | polymeric epoxy: DEH 85 bisphenol A terminated epoxy | Dow Chemical Co., Midland, MI |
| D 84 | polymeric epoxy: DEH 84 bisphenol A terminated epoxy | Dow Chemical Co., Midland, MI |
| D 662 | epoxy: DER 664UE - polyglycidyl ether of bisphenol A epoxy having a molecular weight from 575–685. | Dow Chemical co., Midland, MI |
| D 664 | epoxy: DER 662E - polyglycidyl ether of bisphenol A epoxy having a molecular weight from 875–955. | Dow Chemical co., Midland, MI |
| HRJ | phenolic resole resin: HRJ 1367 butylphenol resole | Schenectady International, Schenectady, NY |
| I 1010 | multifunctional branched hindered phenol: IRGANOX 1010 (tetrafunctional)pentaerythritol tetrakis(3-(3,5-di-tert-butyl-4-hydroxyphenyl)propionate | Ciba Specialty Chemicals, Tarrytown, NY |
| L 1790 | multifunctional branched hindered phenol: LOWINOX 1790 (trifunctional)(1,3,5-tris(4-tert-butyl-3-hydroxy-2,6 dimethylbenzyl)-1,3,5-triazine-2,4,6-(1H,3H,5H)-trione) | Great Lakes Chemical Corp., Indianapolis, IN |
| CPL | LOWINOX CPL: polymeric sterically hindered phenol | Great Lakes Chemical Corp., Indianapolis, IN |
| A 70 | ANOX 70: difunctional branched hindered phenol 2,2'-Thiodiethylene bis[3-(3,5-di-t-butyl-4-hydroxyphenyl) propionate] | Great Lakes Chemical Corp., Indianapolis, IN |
| 2MI | catalyst: 2-methylimidazole | Borregaard Synthesis, Newburyport, MA |
| BZ | processing aid: benzoin | Akzo Nobel Polymer Chemicals, Chicago, IL |
| AHO | surface modified alumina trihydrate filler | J. M. Huber Co., Norcross, GA |
| DICY | Dicyandiamide | Degussa Corp., Parsippany, NJ |
| P103 | 2-methylimidazole | Resolution Co. Houston, TX |
| PL200 | modified polyacrylate flow modifier | Estron Chemicals, Inc. Calvert City, KY |
| M620F | modified polyester (MPP620F) flow modifier | Mico Powder, Inc. Tarrytown, NY |

TABLE 1-continued

Abbreviations

Test Method: Hot-Plate Gel Time

This test method provides qualitative results. Its advantage is that it is easy to do in a short period of time. For consistency purposes, one person performed the test.

Using a temperature probe, test the surface of a hot plate to ensure that it is about 150° C. Pour 0.2 gram of the powdered epoxy onto the surface of the hot plate. Using a wooden tongue depressor, stir the powder into a circle of about 1 inch (2.54 cm) in diameter. Begin timing when the powder is melted. Using the tongue depressor, move the melted powder back and forth. When the melted powder reaches a distinctive gelled consistency, stop timing. The time interval is the gel time of the powder. Using a razor blade, remove the cured resin from the hot plate. Repeat the test two more times and average the three time readings. The inventive composition should have a gel time of about 60 to 180 seconds at 150° C.

Test Method: Pill Flow

Weigh out 0.5 gram of powdered epoxy. Using a 12 mm die and plunger and an air press, press the weighed powder at 47 psi for 5 seconds to form a pellet. A suitable die, plunger, and air press can be obtained from Janesville Tool & Manufacturing, Inc. (JT&M), Milton, Wis. under the A-1000 Series product number. Make two pellets of the powdered epoxy for each example.

Roughen the length of steel plates (either 9 inch×2 inch or 20.5 inch×5 inch) with #80 grit sandpaper. The type of steel used is mild steel. Clean the roughened steel plate with isopropanol and wipe excess off with cheesecloth. Using gloved hands, place the steel plates in a 302° F. (150° C.) at a 10° incline along the length of the plate. Preheat the plate for 20 minutes at 302° F.

Using a digital caliper, measure the thickness of the previously made pellets. Place the two pellets, side-by-side, on the preheated, inclined steel plate in the oven. After 20 minutes, remove the metal plate and measure the length of pellet flow. Calculate the percent flow with the following formula:

%Flow =(length of pellet flow−pellet diameter)÷(pellet thickness)

In the above formula, the pellet diameter should be 12 mm because a 12 mm die was used to make the pellets. The inventive composition should have a pill flow of 45% or greater.

Test Method: Pill Flow (Metal Bar Coating)

Weigh out 0.9 gram of a powdered epoxy composition. Using a 12 mm die and plunger and an air press (A-1000 series unit, available from Janesville Tool and Manufacturing Inc., Milton, Wis.), press the weighed powder into a pellet at 5,000 psi for 20 seconds. Each test requires two pellets.

Heat a glass plate to about 149° C. (300° F.) for about 30 minutes in a heated oven. Place the two pellets, side by side, at the top edge of the heated glass plate placed horizontally in the heated oven. After 35 seconds reposition the glass plate to an incline of 63°. After ten minutes in the inclined position remove the glass plate from the oven and allow it to cool to room temperature. From the reverse side of the glass slide, measure the length of flow of the molten pellets using a millimeter ruler. Preferred compositions have a pill flow of 45 mm or greater.

Test Method: Overlap Shear Strength

For each sample, prepare two steel bars (100 mm×15 mm×1.15 mm). Mild steel should be used. Roughen one end of each bar with #120 sandpaper, lengthwise. Clean the roughened bar with isopropanol and wipe off excess with cheesecloth. Place all roughened, cleaned bars in aluminum pan. Place this pan in a 200° F. oven to preheat for 20 to 40 minutes.

Place 0.17 gram powdered epoxy into a weigh dish. Make 12 mm pills using air press and 12 mm die and plunger (80 psi, 12 seconds), as described in the Pill Flow test method. Remove a first bar from oven and place in one side of an assembly fixture, which was used for convenience to hold the steel bars in place. Press the pellet into sanded side of this bar. Remove a second bar from oven and place in the assembly fixture. Press the roughened sides of bars together. Clamp the sample together with a Lion #107 clip, and remove from the assembly fixture. Place samples into an aluminum pan and then into a 200° F. oven for 30 minutes. Thereafter, increase the oven temperature to 374° F. (190° C.). Allow samples to cure at this temperature for 1 hour 45 minutes or until completely cured. Remove from oven and allow them to cool at room temperature (22° to 25° C.).

Use an Instron to perform tensile shear test. Three samples of powdered epoxy should be prepared and tested at 180° C. Place samples lengthwise in the Instron jaws. A thermocouple is attached to the surface of the lower jaw. The sample is tested when the thermometer registered a temperature within 0.3° C. of the set point temperature. Three samples were tested and the shear calculations are averaged for each example. The inventive composition should have an overlap shear strength of 50 psi or greater at 180° C.

Test Method: Impact Strength

This mechanical strength measurement uses a Gardner impact tester (available from Gardner Laboratories, Inc., Bethesda, Md.)

Use an electrostatic fluid bed to apply powdered resin to aluminum test plates 10 cms×10 cms×0.6 cm to provide a coating thickness from about 375 μm to about 500 μm. Cure coated aluminum test panels for 45 minutes in a heated oven, temperature-controlled at approximately 177° C. (350° F.).

Use the Gardner impact tester with a rod having a diameter of 1.6 cms and a weight of about 1.8 Kg (4 lbs). Dropping the weight on to one end of the rod forces the other end of the rod into contact with a coated test surface. The weight is dropped repeatedly with increasing drop-height between successive drops until there is visible damage of the coating. Passing impact strength for coatings according to the present invention is at least about 115 cmKg (100 inch lbs) with no evidence of damage.

Test Method: Coating Surface Roughness

This measurement uses a Pethometer M4P 150 surface profile measuring instrument (available from (Feinpruf GmbH, Gottingen, Germany).

Use an electrostatic fluid bed to apply powdered resin to aluminum test plates 7.6 cms×15.2 cms×0.6 cm to provide a coating thickness from about 375 μm to about 500 μm. Cure coated aluminum test panels for 45 minutes in a heated oven, temperature-controlled at approximately 177° C. (350° F.).

Surface profile results of three replicates of a length of a test panel provide values of average surface roughness, Ra (DIN 4768) and average roughness depth, Rz.

Ra=Arithmetic mean of all deviations of the roughness profile within the length of the surface profile measurement.

Rz=Mean height between the highest and lowest points, on the surface of a coating, averaged over five successive individual measurement lengths.

Test Method: Flame Retardancy

Measurement of flame retardancy uses test method UL-94-V0 developed by Underwriter's Laboratory, Northbrook, Ill. for determining the safety of plastic materials.

Apply powdered resin to a hot plate heated to 177° C. (350° F.) to melt and spread the powder to a coating thickness of about 500 μm. Remove the fused film from the hot plate before it fully cures and prepare sample strips about 12.5 cms (5 inches) long and about 1.3 cms (0.5 inch) wide. Cure the test strips for 45 minutes in a heated oven, temperature-controlled at approximately 177° C. (350° F.).

Suspend about 12 cms of a specimen vertically from a clamp over a 100% cotton, flat mat 5 cms×5 cms×0.6 cm. The mat weighs no more than about 0.08 g. Thereafter, each specimen is tested according to UL-94 test procedures.

Examples 1 to 3 and Comparative Examples A to H

Powder epoxy compositions were made by charging the components listed in Table 2, all of which are listed in grams, into a Micro-Mill blender and mixing for 60 seconds. The blender was cooled using compressed air having a temperature of 40° to 50° F. Each example was then tested according to the test methods described above.

As the data in Table 3 indicates, Comparative Example A had low pill flow because the amount of IRGANOX 1010, a tetrafunctional branched hindered phenol, used was too low (2 grams). In Comparative Examples B and C, the overlap shear was too low because the amount of phenolic resole resin used was low and nonexistent respectively. In Comparative Example D, the amount of LOWINOX 1790, a trifunctional branched hindered phenol, was too low (2 grams). In Comparative Example E, the overlap shear values were too low because a non-preferred difunctional branched hindered phenol (Anox 70) was used. In Comparative Example F, the overlap shear was again too low because a non-preferred polymeric sterically hindered phenol (LOWINOX CPL) was used. In Comparative Example G, the gel time was too low because a non-preferred crystalline epoxy resin (RSS 1407) was used. In Comparative Example H, the pill flow was too low because no phenolic resole resin was used.

TABLE 2

| | Formulation Compositions | | | | | | | | | | |
|---|---|---|---|---|---|---|---|---|---|---|---|
| Ex. | RD | RSS | D 85 | D 84 | HRJ | I 1010 | L 1790 | A 70 | CPL | 2MI | BZ |
| 1 | 35.0 | 0 | 10.0 | 29.4 | 10.0 | 15.0 | 0 | 0 | 0 | 0 | 0.99 |
| 2 | 35.0 | 0 | 10.0 | 29.4 | 21.8 | 0 | 15.0 | 0 | 0 | 0 | 0.99 |

TABLE 2-continued

Formulation Compositions

| Ex. | RD | RSS | D 85 | D 84 | HRJ | I 1010 | L 1790 | A 70 | CPL | 2MI | BZ |
|---|---|---|---|---|---|---|---|---|---|---|---|
| 3 | 30.0 | 0 | 0 | 0 | 33.5 | 35.0 | 0 | 0 | 0 | 0 | 0.99 |
| A | 35.0 | 0 | 0 | 39.4 | 23.0 | 2.0 | 0 | 0 | 0 | 0.2 | 0.99 |
| B | 35.0 | 0 | 0 | 39.4 | 5.0 | 20.0 | 0 | 0 | 0 | 0 | 0.99 |
| C | 35.0 | 0 | 0 | 39.4 | 0 | 25.0 | 0 | 0 | 0 | 0 | 0.99 |
| D | 35.0 | 0 | 0 | 39.4 | 21.8 | 0 | 2.0 | 0 | 0 | 0 | 0.99 |
| E | 35.0 | 0 | 0 | 39.4 | 14.1 | 0 | 0 | 10.9 | 0 | 0.2 | 0.99 |
| F | 35.0 | 0 | 0 | 39.4 | 0 | 0 | 0 | 0 | 25.1 | 0 | 0.99 |
| G | 0 | 35.0 | 10.0 | 29.4 | 10.0 | 15.0 | 0 | 0 | 0 | 0 | 0.99 |
| H | 35.0 | 0 | 0 | 65.0 | 0 | 0 | 0 | 0 | 0 | 0.2 | 0 |

TABLE 3

Performance Results

| Ex. | Gel Time at 150° C. (seconds) | Pill Flow (%) | Overlap Shear at 180° C. (psi) |
|---|---|---|---|
| 1 | 71 | 44.3 | 75.1 |
| 2 | 137 | 45.6 | 128.0 |
| 3 | 166 | 45.6 | 153.0 |
| A | 81 | 35.3 | 142.5 |
| B | 73 | 47.1 | 2.1 |
| C | 56 | 45.7 | 29.4 |
| D | 77 | 46.6 | 101.9 |
| E | 69 | 47.0 | 29.5 |
| F | 85 | 45.2 | 19.7 |
| G | >300 | 45.9 | 62.4 |
| H | 45 | 28.7 | 87.4 |

Buss Bar Coating Formulations

The following fusion bonded powdered epoxy coating formulations were developed as insulation for metal bars. However, one of ordinary skill in the art will recognize that other uses exist for these and comparable epoxy powders. Examples shown in Table 4 include the letter "B" as a prefix to identify examples suitable for buss bar coating. Unless otherwise indicated, examples given in this section include amounts of materials stated in terms of percent by weight.

Formualtions BA–BF, prepared for application to metal bar substrates, particularly buss bars, provided evidence of improved melt flow at elevated temperatures and improved visual appearance attributable to reduction in the surface roughness of cured coatings. The concentration of alumina trihydrate particulate flame retardant was held at a constant concentration of 55.5% so that all of the examples passed V0 rating according to the UL 94 test method.

Increasing the concentration of the multifunctional, branched hindered phenol (IRGANOX 1010) produced noticeable changes in roughness as measured by Ra and Rz. Lower numerical ratings indicate smoother coatings. Examples BB and BC provide bar coatings somewhat smoother than formulations free from hindered phenol. Formulations containing more than about 4.0% of the hindered phenol show evidence of increased roughness. Although typically used as an antioxidant, a multifunctional, branched hindered phenol may, it appears, be used to modify the melt flow characteristics of fusion bonded powdered epoxy compositions, thereby producing smoother coatings. Desirable coating smoothness occurs when the hindered phenol is added in a range from about 1.25% to about 4.0% of the total composition. The results relate to coatings applied to metal bars using a fluid bed application technique followed by heating to melt, bond and cure the coating to the metal surface. Coatings containing in excess of about 3% of

TABLE 4

Formulation Compositions and Test Results for Metal Bars

| Example | BA | BB | BC | BD | BE | BF |
|---|---|---|---|---|---|---|
| D 664 | 150 | 150 | 150 | 150 | 150 | 150 |
| D 662 | 250 | 250 | 250 | 250 | 250 | 250 |
| AHO | 562.2 (55.5%) | 580.0 (55.5%) | 595.8 (55.5%) | 613.3 (55.5%) | 665.7 (55.5%) | 716.8 (55.5%) |
| AP | 22 | 22 | 22 | 22 | 22 | 22 |
| DICY | 8 | 7 | 6 | 5 | 2 | 0 |
| P103 | 4 | 4 | 4 | 4 | 4 | 4 |
| I 1010 | 0 | 15 (1.4%) | 30 (2.8%) | 45 (4.0%) | 90 (7.5%) | 135 (10.4%) |
| TIO$_2$ | 6 | 6 | 6 | 6 | 6 | 6 |
| Fe$_2$O$_3$ | 0.15 | 0.15 | 0.15 | 0.15 | 0.15 | 0.15 |
| PL200 | 8 | 8 | 8 | 8 | 8 | 8 |
| M62F | 1.6 | 1.6 | 1.6 | 1.6 | 1.6 | 1.6 |
| Gel Time (204° C.) | 94 secs | 93 secs | 98 secs | 104 secs | 104 secs | 113 secs |
| Pill Flow | 46 mm | 51 mm | 53 mm | 47 mm | 35 mm | 23 mm |
| Impact Strength | >184 cmKg | >184 cmKg | >184 cmKg | 46 cmKg | 23 cmKg | 5.7 cmKg |
| Ra | 13.7 μm | 10.4 μm | 9.7 μm | 11.9 μm | 16.8 μm | 20.8 μm |
| Rz | 51.5 μm | 40.4 μm | 30.5 μm | 51.8 μm | 75.7 μm | 85.6 μm |
| UL 94-0 | Pass | Pass | Pass | Pass | Pass | Pass | a multifunctional, branched hindered phenol lose a significant amount of impact strength. Loss in impact strength occurs because of lowering of the effective concentration of the epoxy binding resin in the compositions, e.g. BD–BF. Loss of binding resin causes reduction in pill flow since there is less of the molten phase needed for spreading of the molten coating at elevated temperature.

All references cited herein are incorporated by reference, in each reference's entirety.

As required, detailed embodiments of the present invention are disclosed herein; however, it is to be understood that the disclosed embodiments are merely exemplary of the invention that may be embodied in various and alternative forms. Therefore, details disclosed herein are not to be interpreted as limiting, but merely as a basis for the claims and as a representative basis for teaching one skilled in the art to variously employ the present invention.

What is claimed is:

1. A powdered epoxy composition comprising:

from about 30% to about 40% of at least one epoxy resin selected from the group consisting of diglycidyl ethers of bisphenol A;

from about 55% to about 60% of a particulate flame retardant;

from about 1% to about 4% of at least one multifunctional hindered phenol; and no more than about 5% of at least one adhesion promoter, wherein the powdered epoxy composition has a gel time from about 70 seconds to about 125 seconds at a temperature of about 205° C.

2. The powdered epoxy composition of claim 1, having, upon curing, an average surface roughness from about 10 $\mu$m to about 13 $\mu$m as measured by a Pethometer M4P 150 surface profile measuring instrument.

3. The powdered epoxy composition of claim 1, having, upon curing, an average surface depth from about 30 $\mu$m to about 50 $\mu$m as measured using a Pethometer M4P 150 surface profile measuring instrument.

4. The powdered epoxy composition of claim 1, having, upon curing, an impact strength greater than about 115 cmKg.

5. A cured epoxy coating comprising:

from about 30% to about 40% of at least one epoxy resin selected from the group consisting of diglycidyl ethers of bisphenol A;

from about 55% to about 60% of a particulate flame retardant;

from about 1% to about 4% of at least one multifunctional hindered phenol; and no more than about 5% of at least one adhesion promoter, said cured coating having an average surface roughness from about 10 $\mu$m to about 13 $\mu$m as measured using a Pethometer M4P 150 surface profile measuring instrument, wherein the cured epoxy coating has a gel time from about 70 seconds to about 125 seconds at a temperature of about 205° C.

6. The cured epoxy coating of claim 5, having an average surface depth from about 30 $\mu$m to about 50 $\mu$m as measured using a Pethometer M4P 150 surface profile measuring instrument.

7. The cured epoxy coating of claim 5, having an impact strength greater than about 115 cmKg.

8. A powdered epoxy composition comprising:

from about 30% to about 40% of at least one epoxy resin selected from the group consisting of diglycidyl ethers of bisphenol A;

from about 55% to about 60% of a particulate flame retardant;

from about 1% to about 4% of at least one multifunctional hindered phenol; and no more than about 5% of at least one adhesion promoter, wherein said at least one multifunctional hindered phenol is pentaerythritoltetrakispropionate.

9. The powdered epoxy composition of claim 8, having, upon curing, an average surface roughness from about 10 $\mu$m to about 13 $\mu$m as measured by a Pethometer M4P 150 surface profile measuring instrument.

10. The powdered epoxy composition of claim 8, having, upon curing, an average surface depth from about 30 $\mu$m to about 50 $\mu$m as measured using a Pethometer M4P 150 surface profile measuring instrument.

11. The powdered epoxy composition of claim 8, having, upon curing, an impact strength greater than about 115cmKg.

* * * * *

UNITED STATES PATENT AND TRADEMARK OFFICE
CERTIFICATE OF CORRECTION

PATENT NO. : 6,933,332 B2
DATED : August 23, 2005
INVENTOR(S) : Guilbert, Curtis R.

It is certified that error appears in the above-identified patent and that said Letters Patent is hereby corrected as shown below:

Column 9,
Line 35, after "as" delete "5".

Signed and Sealed this

Twenty-first Day of March, 2006

JON W. DUDAS
*Director of the United States Patent and Trademark Office*